US011508079B2

(12) United States Patent
Tsai et al.

(10) Patent No.: US 11,508,079 B2
(45) Date of Patent: Nov. 22, 2022

(54) PARALLELISM IN DISPARITY MAP GENERATION

(71) Applicant: Intel Corporation, Santa Clara, CA (US)

(72) Inventors: Wei-Yu Tsai, Chandler, AZ (US); Amit Aneja, Chandler, AZ (US); Maciej Adam Kaminski, Chandler, AZ (US); Dhawal Srivastava, Scottsdale, AZ (US); Jayaram Puttaswamy, Bellevue, WA (US); Mithali Shivkumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 159 days.

(21) Appl. No.: 16/456,356

(22) Filed: Jun. 28, 2019

(65) Prior Publication Data
US 2019/0318494 A1 Oct. 17, 2019

(51) Int. Cl.
*G06T 7/55* (2017.01)
*G06T 7/174* (2017.01)
(Continued)

(52) U.S. Cl.
CPC .............. *G06T 7/55* (2017.01); *G06F 9/4881* (2013.01); *G06T 7/12* (2017.01); *G06T 7/174* (2017.01);
(Continued)

(58) Field of Classification Search
CPC ... G06T 7/70; G06T 7/73; G06T 2207/20228; G06T 2207/20212; G06T 2207/20224;
(Continued)

(56) References Cited

U.S. PATENT DOCUMENTS

| 2004/0008892 A1* | 1/2004 | Hill ........................ G06K 9/52 382/228 |
| 2011/0188736 A1* | 8/2011 | Xu .......................... G06K 9/48 382/154 |

(Continued)

FOREIGN PATENT DOCUMENTS

| AU | 2017315674 B2 * | 12/2019 | ............. G06N 3/084 |
| WO | WO-2009061305 A1 * | 5/2009 | ............. G06T 5/002 |

OTHER PUBLICATIONS

Hirschmuller, Heiko, "Stereo processing by by semiglobal matching and mutual information", IEEE Transactions on pattern analysis and machine intelligence 30, No. 2, (2008), 328-341.
Spangenberg, Robert, et al., "Large Scale Semi-Global Matching on the CPU", IEEE Intelligent Vehicles Symposium (IV), (2014), 195-201.

*Primary Examiner* — Claire X Wang
*Assistant Examiner* — Stephen M Brinich
(74) *Attorney, Agent, or Firm* — Schwegman Lundberg & Woessner, P.A.

(57) ABSTRACT

Input images are partitioned into non-overlapping segments perpendicular to a disparity dimension of the input images. Each segment includes a contiguous region of pixels spanning from a first edge to a second edge of the image, with the two edges parallel to the disparity dimension. In some aspects, contiguous input image segments are assigned in a "round robin" manner to a set of sub-images. Each pair of input images generates a corresponding pair of sub-image sets. Semi-global matching processes are then performed on pairs of corresponding sub-images generated from each input image. The SGM processes may be run in parallel, reducing an elapsed time to generate respective disparity sub-maps. The disparity sub-maps are then combined to provide a single disparity map of equivalent size to the original two input images.

24 Claims, 12 Drawing Sheets

(51) Int. Cl.
*G06T 7/12* (2017.01)
*G06F 9/48* (2006.01)
*G06T 7/70* (2017.01)
*G06V 10/75* (2022.01)

(52) U.S. Cl.
CPC .............. *G06T 7/70* (2017.01); *G06V 10/751* (2022.01); *G06T 2207/20228* (2013.01)

(58) Field of Classification Search
CPC .. G06K 9/6202; G06K 9/6201; G06K 9/6204; G06K 9/6205; G06F 9/4881
USPC .......................... 382/100, 106, 113, 130, 128
See application file for complete search history.

(56) References Cited

U.S. PATENT DOCUMENTS

| | | | |
|---|---|---|---|
| 2013/0136338 A1* | 5/2013 | Asente | G06K 9/342 |
| | | | 382/154 |
| 2016/0269615 A1* | 9/2016 | Deng | G06T 7/38 |
| 2018/0137625 A1* | 5/2018 | Somanath | G06K 9/4638 |
| 2018/0276805 A1* | 9/2018 | El Dokor | H05K 999/99 |
| 2019/0028698 A1* | 1/2019 | Lin | H04N 13/268 |
| 2019/0035098 A1* | 1/2019 | Pinard | G06T 7/593 |
| 2019/0180461 A1* | 6/2019 | Yang | H04N 13/239 |
| 2020/0111219 A1* | 4/2020 | Potocek | G02B 21/367 |
| 2020/0349846 A1* | 11/2020 | Siboni | B60Q 9/008 |

* cited by examiner

PARALLELISM IN DISPARITY MAP GENERATION

TECHNICAL FIELD

Embodiments pertain to image analysis and specifically to generation of a disparity map. The disparity map may be used to determine a distance between an object in a scene and a pair of imaging sensors.

BACKGROUND

Stereo image processing is employed to obtain three-dimensional information (e.g. depth) from a pair of two-dimensional images captured by two separate cameras. A horizontal disparity of object pixel locations from left and right images corresponds to a distance of the cameras from the object. A higher disparity between the images indicates a relatively closer object, while lower disparity indicates greater distance.

Semi-global matching (SGM) has been proposed as an efficient way to produce a disparity map representing disparity information of pixels at respective pixel locations in a two-dimensional map. SGM performs regional matching-cost aggregation in contrast to the global cost aggregation employed in traditional approaches. However, SGM can be computationally intensive. Thus, improved methods of generating a disparity map are needed.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
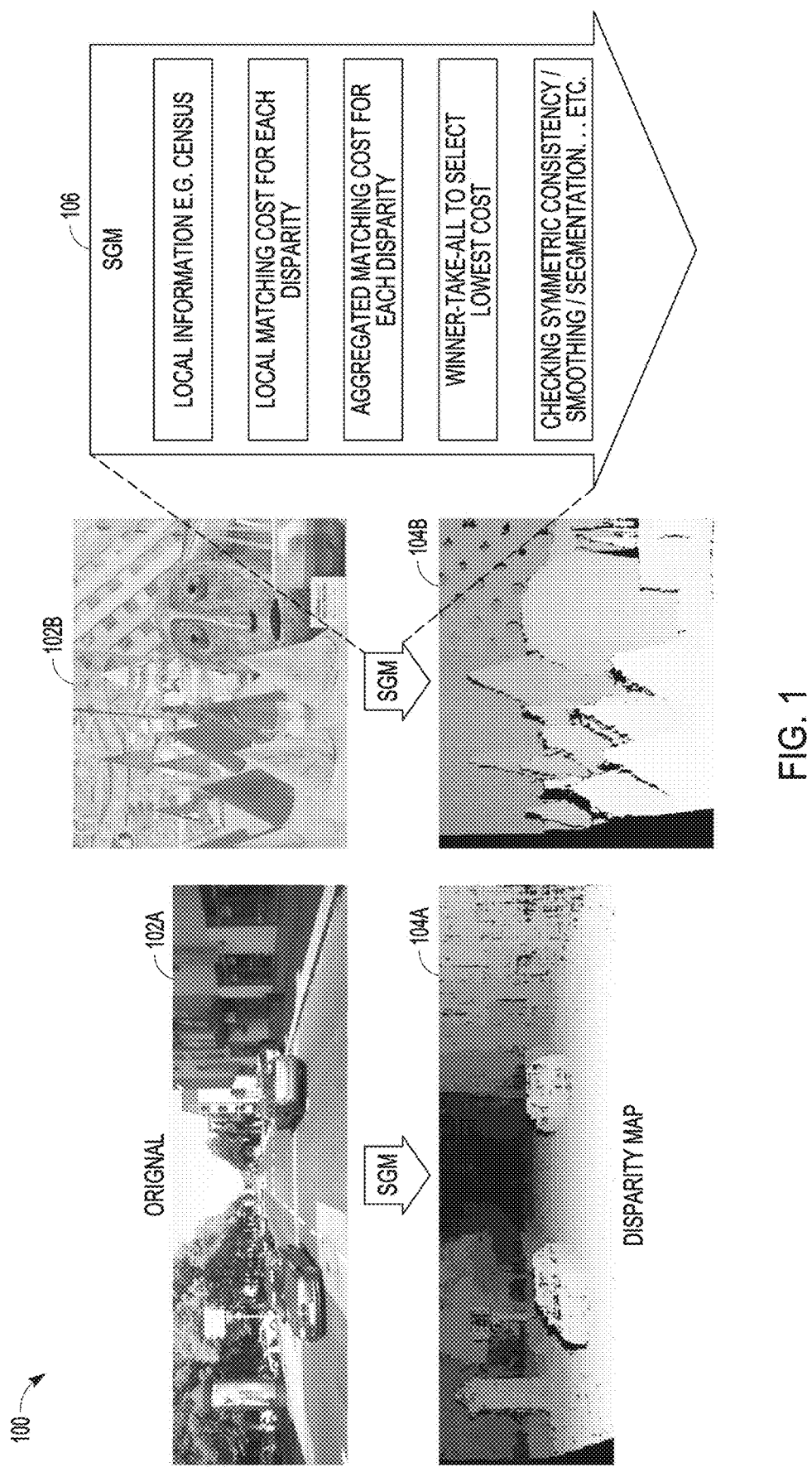
FIG. 1 is an overview diagram of a disparity map generation process.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Semi-global matching (SGM) typically includes several stages to generate a disparity map. These include local information compression using census or mutual information, matching cost calculation, and cost aggregation followed by a winner take all operation. SGM implementations may be implemented using dynamic programming to reduce redundant computations. However, processing requirements for generating a disparity map using SGM from high-resolution images requires a relatively large amount of compute power, and thus long processing times to generate results. Given that dynamic programming tends to be sequential in nature to ensure computations occur in order, SGM using dynamic programming cannot be directly parallelized via pixel-by-pixel processing unlike other computer vision algorithms. Doing so would risk exposing certain race conditions that may result in some results being randomly overwritten.

One way to reduce processing times is to parallelize at least portions of the processing path. Slicing is one technique that may be used. In slicing, images are separated into horizonal pieces. Tiling is another technique, where images are both horizontally and vertically cropped. Tiling may provide for finer granularity such that processing may be more highly parallelized when compared too slicing. Tiling requires tiles to overlap along a dimension for which disparity will be measured (e.g. horizontal), with the amount of overlap greater than or equal to an expected disparity range, which may typically be between 64 and 256 pixels. A few pixels of overlap may also be necessary in a dimension perpendicular to the disparity dimension (e.g. vertically). This overlap results in some processing redundancy, increasing the total amount of data that must be processed when tiling is employed.

Down-sampling may also be used to reduce computation needed to implement an SGM method. In some cases, a disparity range may be reduced. However, reducing the disparity range risks side effects resulting from a failure to detect objects in some cases. Disparity space compression has also been proposed to reduce computation while providing for detection of objects within a limited depth range. However, this approach includes non-uniform data access and may not take best advantage of modern CPU architectures with vectorized instruction sets.

Thus, the serial execution of the SGM algorithm when using dynamic programming limits parallelism that may be employed, especially on multi-core processors. Although slicing provides a certain level of parallelism, the total amount of computation SGM requires leads to a long execution time and makes it prohibitively slow to utilize this approach in real time applications, such as autonomous driving.

The disclosed embodiments provide a new approach to parallelize the SGM algorithm. This new approach is more efficient than tiling and reduces the computation necessary to generate a disparity map while maintaining the image resolution. The proposed approach also maintains the depth range, thus preserving an ability to detect objects.

FIG. 1 is an overview diagram of a disparity map generation process 100. A disparity map is generated by identifying matching features in a pair of images. A disparity value defines an offset between matching features in the pair of images. FIG. 1 shows two example images 102a and 102b. Each of the images 102a and 102b are single members of a pair of images, with the other image of each pair not shown in FIG. 1. The two pairs of images including the images 102a and 102b respectively are compared to generate disparity maps 104a and 104b respectively. As discussed above, a semi-global matching process 106 may be utilized in some embodiments to generate the disparity maps (e.g. 104a and 104b) from pairs of images. A single semi-global matching process 106 can be challenging to parallelize, as there are many dependencies within the process 106.

The disclosed embodiments provide for the use of multiple semi-global matching processes which result in reducing an elapsed time to generate a disparity map, such as the disparity maps 104a-b of FIG. 1.

Figure 2:
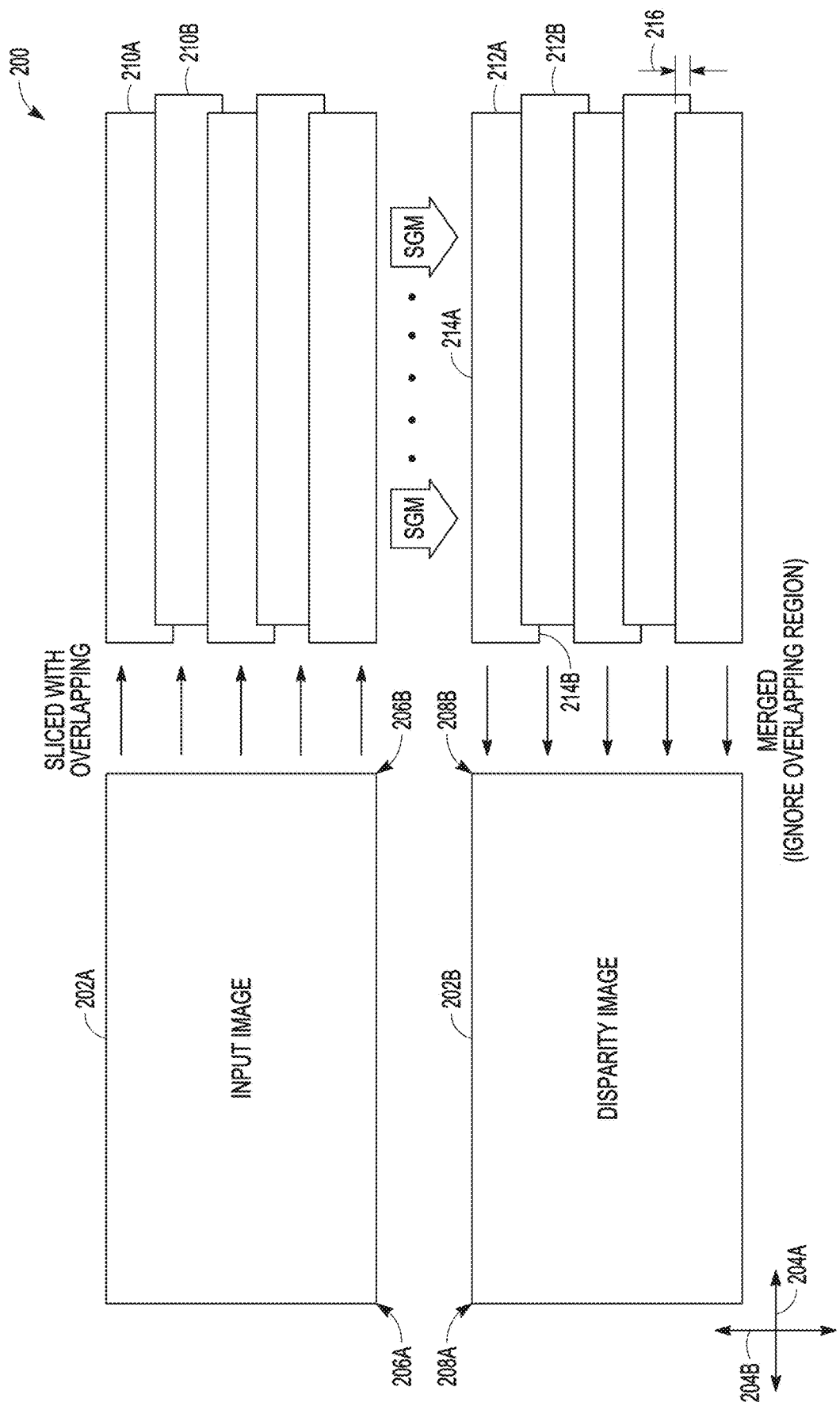
FIG. 2 visually illustrates slicing of images when generating a disparity map.

FIG. 2 visually illustrates slicing of two images. The slicing is performed to facilitate determination of a disparity map for the two images. As shown, the disparity between the two images will be measured with respect to a horizontal dimension, or a dimension parallel to the x axis 204a and perpendicular to the y axis 204b. Slicing divides each of the two input images 202a-b into segments. A portion of segments dividing image 202a are labeled as 210a and 210b. A portion of segments dividing image 202b are labeled as 212a and 212b. The segments include a continuous region of pixels spanning from a first edge of the image (e.g. 206a and 208a) to a second edge of the image (e.g. 206b and 208b). Each of the segments divides an input image along two borders that are parallel to a disparity dimension of the two images. Two borders of segment 212a are labeled as 214a-b. One border of a segment may be an edge of the respective input image.

The disparity dimension is parallel to the x axis 204a, as are the borders of the segments. Two adjacent segments (e.g. 212a and 212b) include some overlap. In other words, each of every two adjacent segments share some pixel values derived from the exact same pixel values of a respective input image (e.g. 202b). Example overlap is visually illustrated as 216. When using slicing, some overlap between slices is necessary to provide for local information compression. Techniques such as Census compare a center indexing pixel to surrounding pixels. Without overlapping, resulting images would be disturbed due to incomplete information being available at the edges of each slice. While slicing has some disadvantages as described above, some of the disclosed embodiments may employ slicing in addition to the sparse sampling method described in more detail below. This may realize some performance advantages in some embodiments.

Figure 3:
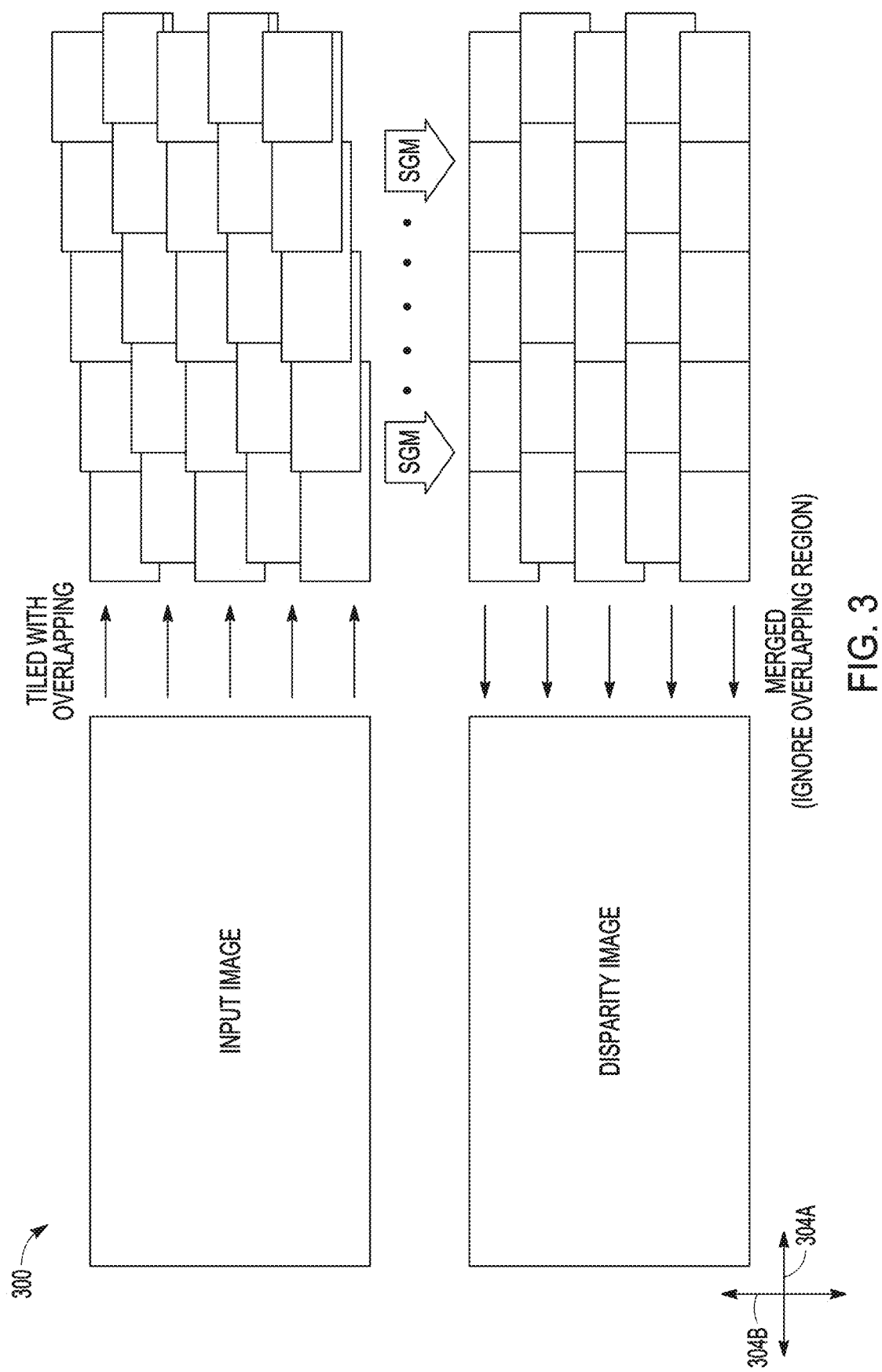
FIG. 3 visually illustrates a tiling process for generating a disparity map.

FIG. 3 visually illustrates a tiling process 300. Tiling divides an image both along a disparity dimension of the image but also along a dimension perpendicular to the disparity dimension. Thus, as shown in FIG. 3, tiling divides an image along dimensions parallel with both the x axis 304a and y axis 304b. One performance advantage of tiling over slicing is that tiling provides for a greater number of partitions of an image when compared to slicing. One disadvantage of tiling relative to slicing is that some overlapping between tiles is needed along both the disparity dimension and the dimension perpendicular to the disparity dimension to ensure proper disparity computations.

Figure 4:
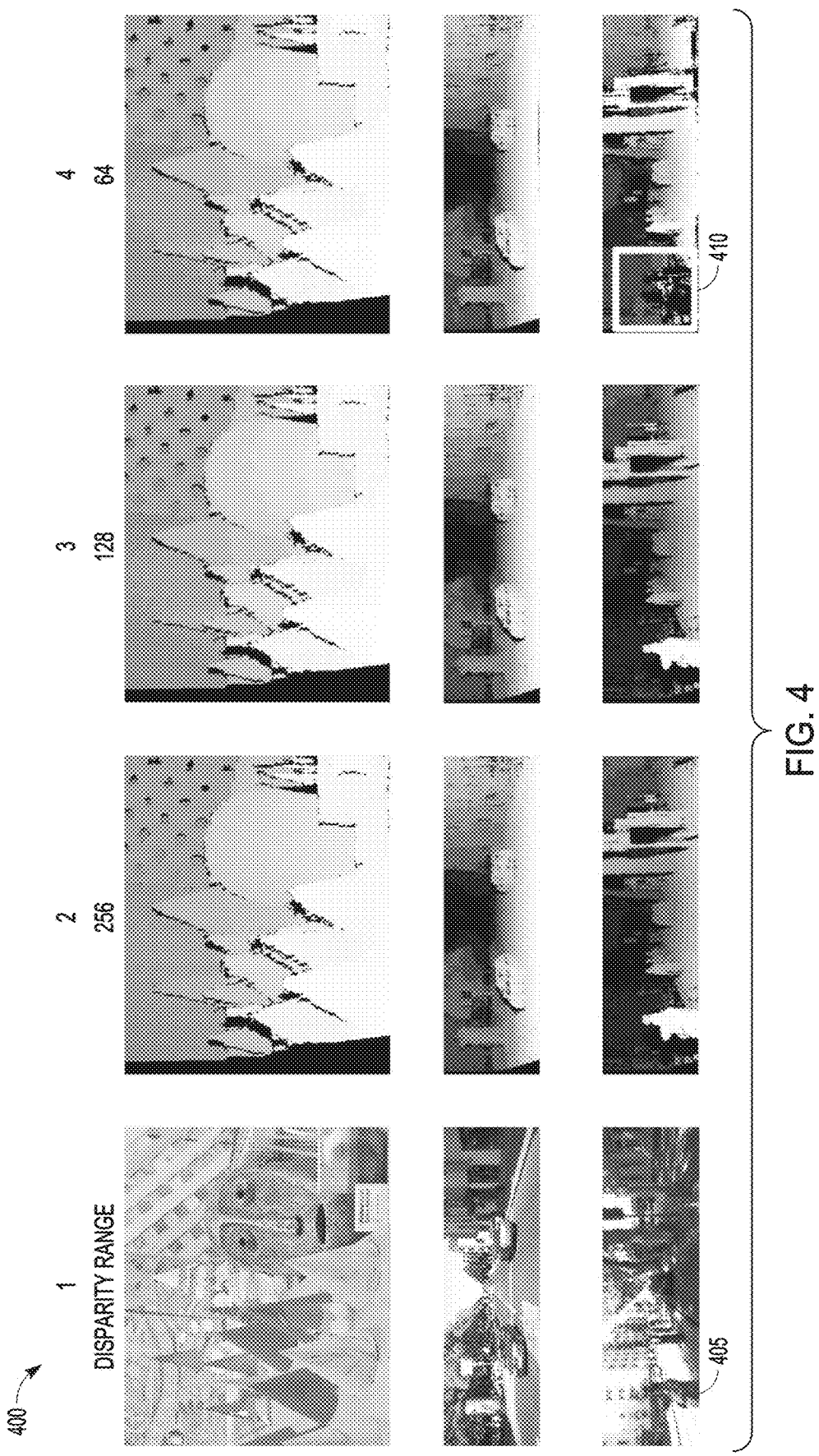
FIG. 4 visually illustrates effects associated with reducing a disparity range.

FIG. 4 visually illustrates effects 400 associated with reducing a disparity range. Reduction of a disparity range may also reduce processing overhead associated with generation of a disparity map. By reducing the disparity range, a search space associated with matching a first pixel in a first image with a second pixel in a second image is narrowed, leading to a reduction in computational requirements that is proportional to a reduction in the disparity range. In some cases, reduction of a search space may result in failure to detect objects that are close to the imaging sensors, and thus have a relatively higher disparity across the two imaging sensors.

FIG. 4 shows ground truth images in column one, and then disparity maps generated for those images using a disparity range of 256, 128, and 64 pixels for columns two, three, and four respectively. FIG. 4 illustrates that when a disparity range of 64 is used, a pedestrian 405 close to the camera is not properly detected (the improper identification shown via box 410).

Figure 5:
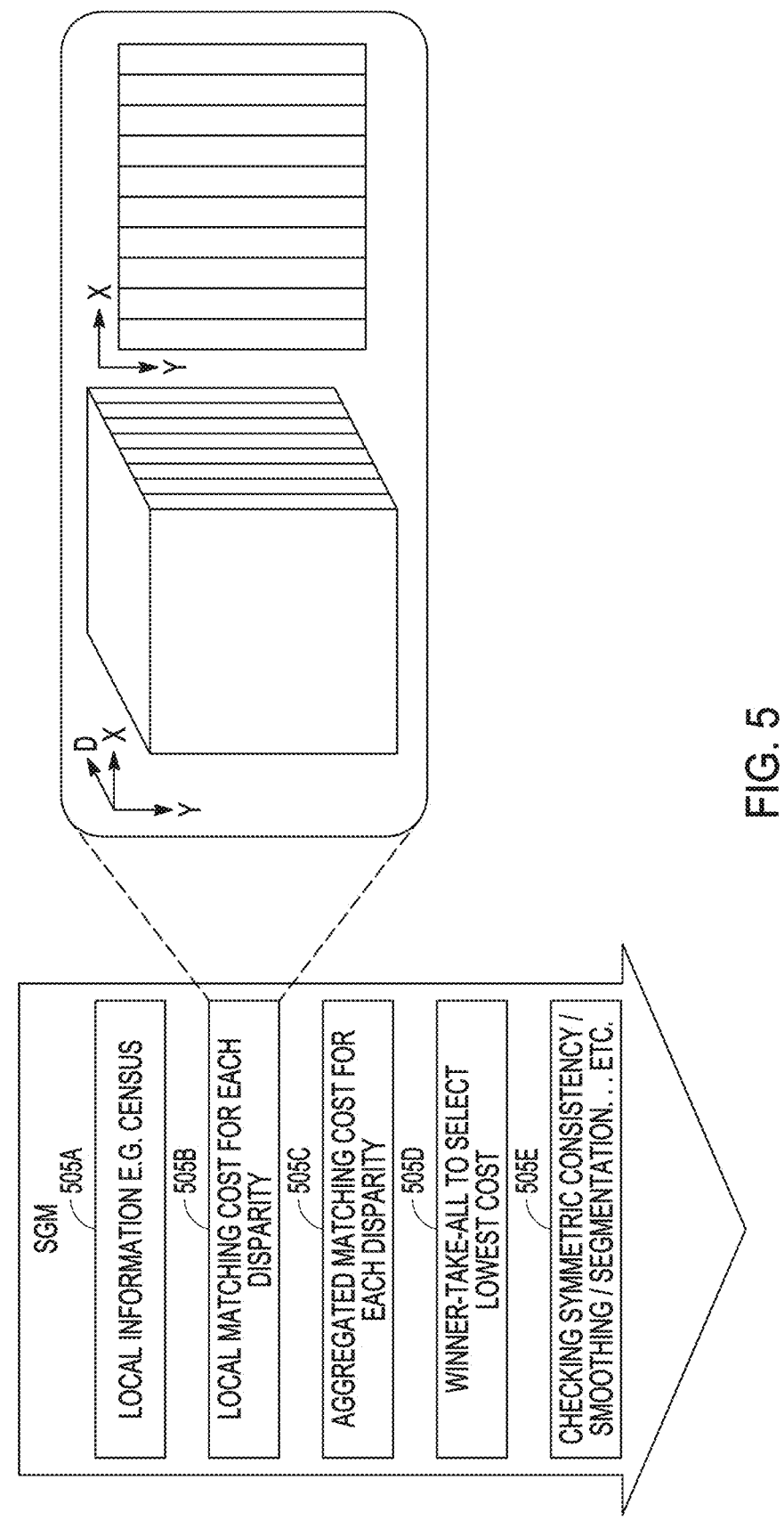
FIG. 5 visually illustrates disparity space compression.

FIG. 5 visually illustrates disparity space compression 500. FIG. 5 shows that a semi-global matching process includes at least five cost components, labeled as 505a-e. Component 505a identifies local information. This local information may be identified via the Census algorithm. Cost component 505b results from local matching for each disparity calculation. The local matching cost relates to a size of a search space used to identify matching features of two input images. The smaller the search space, the lower the local matching cost. However, smaller search spaces increases risk that matching features may not be identified. This is especially the case for image features relatively closer to imaging sensors. FIG. 5 also shows three additional components of the semi-global matching process, including aggregated matching cost for each disparity 505c, winner take all to select lowest cost 505d, and checking symmetric consistency/smoothing/segmentation 505e.

Disparity space compression skips calculations of some values within a disparity range. In this approach, a compressed disparity space covers an equivalent depth distance while computation requirements are reduced. Disparity space compression does not necessarily take advantage of vectorization and parallelization implementations due to pixel-wise matching costs with a relatively large volume of image data. To provide for skipping of some computations, pixel indexing may result in non-sequential access patterns, which makes vectorization difficult. For example, vectorized instructions such as streaming SIMD extensions (SSE) and advanced vector extensions (AVX) move data from contiguous address spaces and process multiple values simultaneously as vectors. When using disparity space compression, the pixel index identifies non-contiguous portions of memory and thus vectorized operations are less efficient.

Figure 6:
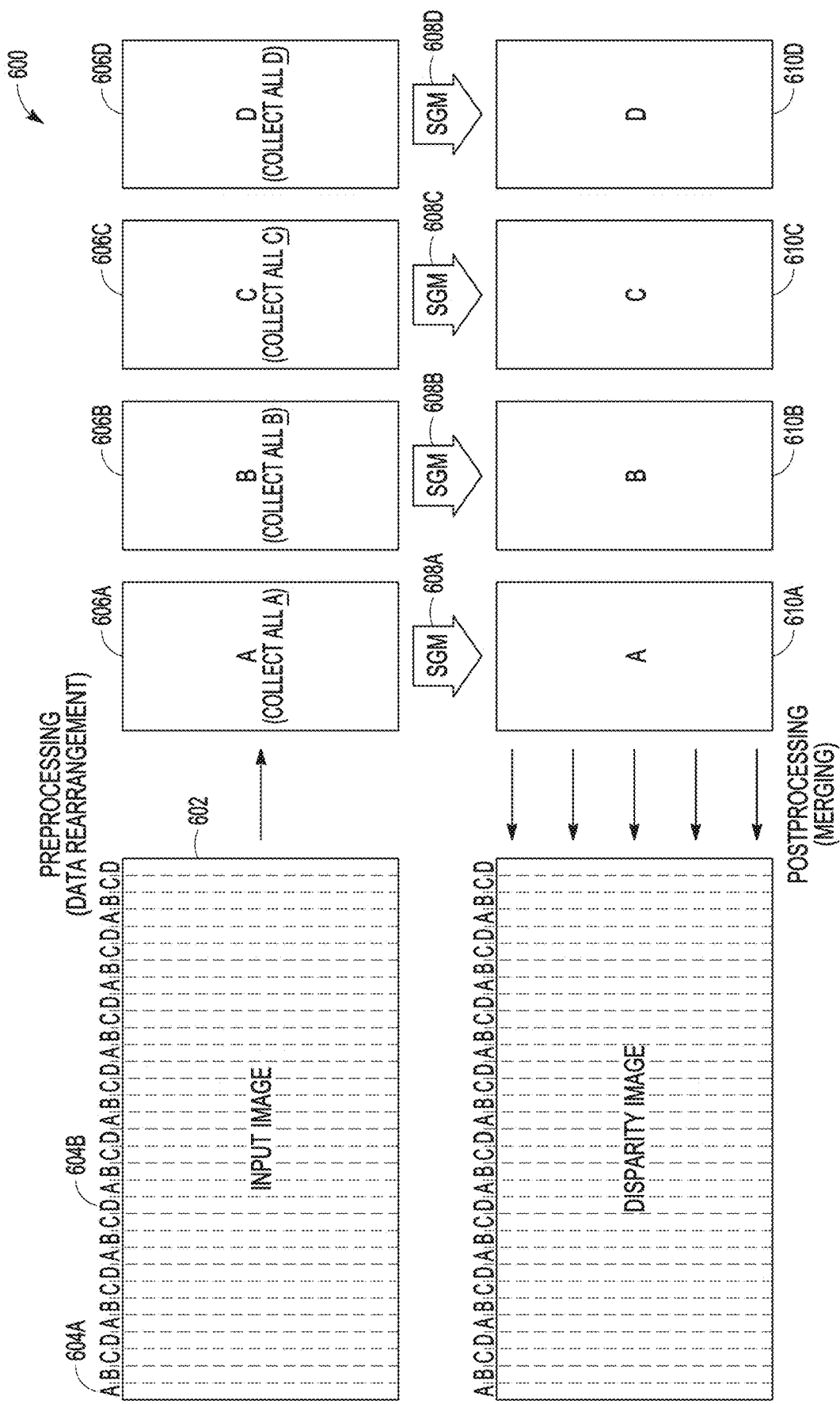
FIG. 6 visually illustrates segmentation of images used for disparity map generation.

FIG. 6 visually illustrates segmentation 600 of images used for disparity map generation. The segmentation 600 illustrated in FIG. 6 may be utilized in one or more of the disclosed embodiments. FIG. 6 shows an input image 602 that is divided into a number of "vertical" columns. While FIG. 6 shows a single input image 602 and four sub-images 606a-d generated from the input image 602, the disclosed embodiments generate operate on at least two input images.

FIG. 6 illustrates segmentation of the input image 602 such that the image 602 is divided along a dimension that is perpendicular to a disparity dimension of the input image 602. In some aspects, the disparity dimension is aligned with an axis on which multiple imaging sensors capturing the at least two input images lie. For instance, if the cameras are arranged with a horizontal offset, then the disparity dimension in on the horizontal plane. Alternatively, if the imaging sensors are arranged vertically, then the disparity dimension is on a vertical plane. If a disparity map is generated to identify differences between two images along a horizonal dimension of the two images, the disclosed embodiments provide for vertical division of the images, or division along a dimension that is perpendicular to the disparity dimension. If another embodiment generates a disparity map for differences along a vertical dimension of two images, then the disclosed embodiments would divide the images along their horizonal dimension, in contrast to the example illustrated in FIG. 6. Each segment would include contiguous pixels from a first edge of the input image 602 to a second edge of the input image 602, with the first edge and second edge parallel to a disparity dimension of the input image 602.

FIG. 6 further shows each sequential segment of the input image 602 labeled with an identifying letter. Two of these segments are labeled as segments 604a and 604b. For clarity of illustration, each of the segments of the input image 602 is not provided with a reference number.

The disclosed embodiments allocate any two contiguous segments of the input image 602 to two different sub-images. Four sub-images 606a-d are shown in FIG. 6. Each of the sub-images 606a-d are generated from a plurality of non-contiguous segments from the input image 602. In some aspects, sequential segments of the input image 602 are allocated to separate sub-images. Thus, for example, in embodiments generating four sub-images per input image, each fourth column is allocated to a particular sub-image. To continue with this example, a first sub-image (e.g. 606a) could be constructed using a $1^{st}$, $5^{th}$, $9^{th}$, $13^{th}$, etc. segment of the input image 602. A second sub-image (e.g. 606b) could be constructed using a $2^{nd}$, $6^{th}$, $10^{th}$, $14^{th}$, etc. segment of the input image 602. A third sub-image (e.g. 606c) could be constructed using a $3^{rd}$, $7^{th}$, $11^{th}$, $15^{th}$, etc. segment of the input image 602. A fourth sub-image (e.g. 606d) could be constructed using a $4^{th}$, $8^{th}$, $12^{th}$, $16^{th}$, etc. segment of the input image 602.

While FIG. 6 shows a single input image, the process of segmentation described above with respect to input image 602 would be replicated for a second input image, not shown in FIG. 6. Four additional sub-images would also be generated, in a manner similar to that described above with respect to sub-images 606a-d, for the second input image.

Each of the sub-images 606a-d are then processed via separate SGM processes 608a-d (along with the second sub-images (not shown) generated from the second input image (also not shown)) to generate corresponding disparity maps 610a-d.

Although four sub-images are constructed in the example of FIG. 6, it is understood that more or fewer segment groups may be used and that a corresponding more or fewer SGM processes may be implemented to parallelize the processing.

Figure 7:
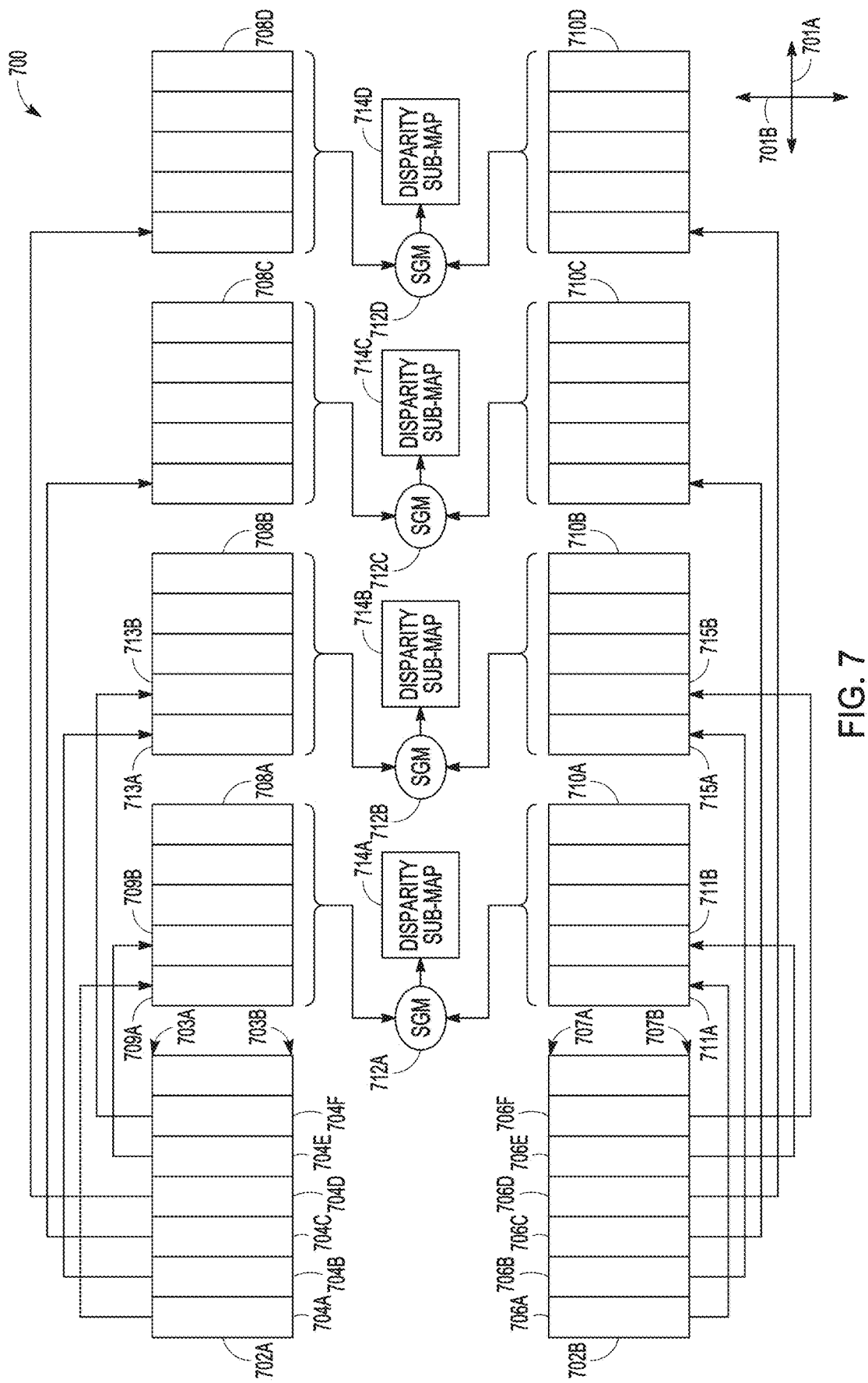
FIG. 7 is a detailed view of data flow in at least one of the disclosed embodiments.

FIG. 7 is a detailed view of data flow 700 in at least one of the disclosed embodiments. FIG. 7 shows a coordinate system including two perpendicular axis 701a and 701b. FIG. 7 also shows two input images 702a and 702b. Each of the input images 702a and 702b may be captured by separate imaging sensors. In some aspects, the separate imaging sensors are offset along a first axis (e.g. x axis 701a) to provide for an overlapping but offset field of view of the two imaging sensors. In another implementation, the two imaging sensors may be aligned along a second axis (e.g. y axis 701b).

The disclosed embodiments generate a disparity map (not shown) based on the two input images 702a-b. The disparity map indicates disparities in position between matching pixels in the first image 702a and second image 702b. The disparities are measured with respect to a first dimension or axis within a coordinate system. For ease of illustration, the example of FIG. 7 is described such that disparities in position between matching pixels in two images 702a-b are measured with respect to the first (x) axis 701a. This type of disparity is commonly referred to as horizontal disparity. However, the disclosed embodiments are not limited to measuring disparity with respect to the Earth's horizon.

The disclosed embodiments provide for logical partitioning of each of the two input images 702a and 702b into a plurality of segments. Example segments of input image 702a are shown as 704a-f. Example segments of input image 702b are shown as 706a-f. Coordinates of pixels included in each of the segments is bounded with respect to the axis for which disparity will be measured.

In the example of FIG. 7, this is axis 701a. Axis 701a coordinate values for pixels included in a first segment may be constrained by C1<x<=C2, where C1 and C2 are constants. A second segment conjoining the first segment may be constrained by C2<x<=C3. A further third conjoining segment is constrained by C3<x<=C4. Note that each of C2-C1, C3-C2, and C4-C3 is less than a width of the input image 702a or 702b along the first axis 701a. In some aspects, each segment is one pixel wide.

The segments 704a-f and 706a-f are illustrated as a contiguous region of pixels spanning from a first edge of the image 702a-b respectively to a second edge of the images 702a-b respectively. The first and second edges of image 702a are labeled as 703a-b respectively. The first and second edges of input image 702b are labeled as 707a-b respectively. The first and second edges 703a-b and 707a-b of the input images 702a-b respectively are parallel to or consistent with a dimension upon which the disparities between input images 702a and 702b are measured. in the example illustrated in FIG. 7, horizontal disparities between input images 702a-b are determined (discussed in more detail below). The first and second edges 703a-b and 707a-b also run horizontally, or are parallel to a horizontal dimension of the first and second input images 702a-b. Thus, each of the segments 704a-f and 706a-f encompass a contiguous region of pixels between the first and. second edges of their respective input images 702a and 702b, but each individual segment includes only a portion of pixels on the first and second edges.

FIG. 7 further illustrates the assignment or allocation of the segments 704a-f and 706a-f to different sub-images 708a-d and 710a-d respectively. The sub-images 708a-d are generated based on segments (e.g. 704a-f) from the input image 702a. In some aspects, contiguous segments of the input image (e.g. such as segments 704a and 704b) are used to generate different sub-images.

As discussed above with respect to FIG. 6, segments may be identified sequentially along the first dimension (horizontal in FIG. 7). A unique identification may be provided for each sub-image to be generated, with multiple segments identified with the same identifier (letters in the example of FIG. 6). In some aspects, the identifies may be assigned in a round robin manner to the segments, for example, as discussed above with respect to FIG. 6. Each individual sub-image is then generated based on segments from an input image identified with the same identifier. In some other aspects, segments are identified sequentially. The sequential identifiers may then be divided by a number of sub-images generated from an input image. A remainder value from the division may identify a sub-image to which the segment is allocated. In some aspects, no explicit identification is performed, but the identification is used here to illustrate the allocation of segments to generate sub-images.

FIG. 7 shows that sub-image 708a is based on at least segments 704a and 704e. Sub-image 708b is based on at least segments 702b and 704f (e.g. corresponding segments 713a and 713b). FIG. 7 illustrates that sub-image 708c is based on at least segment 704c and sub-image 708d is based on at least segment 704d. Thus, FIG. 7 shows a round robin pattern of segment allocation or assignment of segments 704a, 704b, 704c, and 704d to sub-images 708a, 708b, 708c, and 708d respectively. The assignment pattern then repeats by assigning segments 704e and 704f to sub-images 708a (segment 713a) and 708b (713b) respectively. Segment allocation or assignment of segments 706a-f of input image 702b uses an equivalent pattern as that of image 702a. FIG. 7 shows segments 706a, 706b, 706c, and 706d being sequentially assigned to sub-images 710a, 710b, 710c, and 710d respectively. Segment 706a is used to generate segment 711a of sub-image 710a. Segment 706b is used to generate segment 715a.

The pattern then repeats by assigning at least segments 706e and 706f to sub-images 710a and 710b respectively (as segments 711b and 715b). Thus, the assignment of segments 706a-f of input image 702b also follows a round robin assignment pattern to the sub-images 710a-d.

Note that while the discussion of FIG. 7 may refer to assignment or allocation of segments from an input image to a sub-image, no explicit assignment or allocation may be performed. Instead, the disclosed embodiments generate sub-images based on selected segments of an input image. Allocation or assignment of a segment indicates that pixel data within the segment is used to generate a portion of the referenced sub-image. In some aspects, an exact copy of pixel data within a segment forms a portion of a sub-image to which the segment is allocated or assigned. In some aspects, segment allocation or assignment is performed without copying any pixel data from an input image. Instead, separate data structures that map portions of an input image to different sub-images may be maintained, without physically copying data of the image itself. Thus, in some aspects, there is no duplication of data between the image and its respective sub-images.

In some embodiments conjoining or adjacent segments within an input image (e.g. 702a or 702b) are assigned sequentially to different sub-images. Conjoining segments in each sub-image may be equivalent to a fixed order sampling of segments from the respective input image. For example, if there are four sub-images, segments of a sub-image may be a result of sampling every fourth segment of an input image. Thus. if segments of an input image are being allocated to N sub-images, every Nth sequential segment of the input image may be allocated to a particular sub-image. A result may be that two conjoining segments in a sub-image are equivalent to two segments from the respective input image that were positioned. N segments apart in the input image.

Further assignments or allocations are not shown to preserve figure clarity. While in some embodiments, sub-images may have more segments assigned than the five illustrated in FIG. 7, the illustrated segments are shown for purposes of explaining the operation of the embodiment of FIG. 7, and should not be considered limiting.

Once the sub-images 708a-d and 710a-d are generated from the two input images 702a and 702b respectively, a disparity sub-map is generated for each corresponding pair of sub-images. FIG. 7 shows that corresponding sub-image pairs 708a and 710a are used to generate disparity sub-map 714a using SGM 712a. Corresponding sub-image pairs 708b and 710b are used to generate disparity sub-map 714b using SGM 712b. Corresponding sub-image pairs 708c and 710c are used to generate disparity sub-map 714c using SGM 712c. Corresponding sub-image pairs 708d and 710d are used to generate disparity sub-map 714d using SGM 712d.

Each sub-image in a corresponding pair of sub-images is generated from segments of its respective input image that are equivalently positioned to other segments used to generate the other sub-image in the pair. Thus, for example, if a first sub-image is derived from segments a, e, i, and m of a first input image, a corresponding second sub-image of the first sub-image is also derived from equivalently identified segments a, e, i, and m of a second input image. The first and second sub-images are corresponding pairs in this example.

Each of the disparity sub-maps 714a-d identify disparities between matching features or pixel values in two sub-images. The disparity values represent a relative difference in location of matching pixel values or features in the two sub-images. The relative difference is generally with respect to one of the two sub-images. Thus, for example, disparity values in a disparity map may be relative to pixel value or feature locations in a first sub-image. If matching pixel values are identified at a first location in the first sub-image and a second location in the second sub-image, a positive disparity value indicates the second location has a lower coordinate value in the first dimension than the first location. A negative disparity value indicates the second location has a higher coordinate value in the first dimension than the first location. Thus, a disparity value for a pixel location in the first sub-image may be determined via. Equation 1 below:

Given:

$x_1, y_1$—feature "a" location in a first sub-image, $x_2, y_2$—feature "a" location in a second sub-image, $$\text{disparity value} = x_1 - x_2 \quad \text{(Equation 1)}$$

Coordinates of a disparity value within a disparity map may be equivalent to a location of a corresponding pixel or feature location in either the first or second sub-image. Thus, continuing with the Equation 1 above, coordinates of the disparity value in a disparity map generated from the first sub-image and the second sub-image may be $(x_1, y_1)$.

While not shown in FIG. 7, each of the disparity sub-maps 714a-d may be combined to generate a disparity map of size equivalent to dimensions of the input images 702a or 702b.

Figure 8:
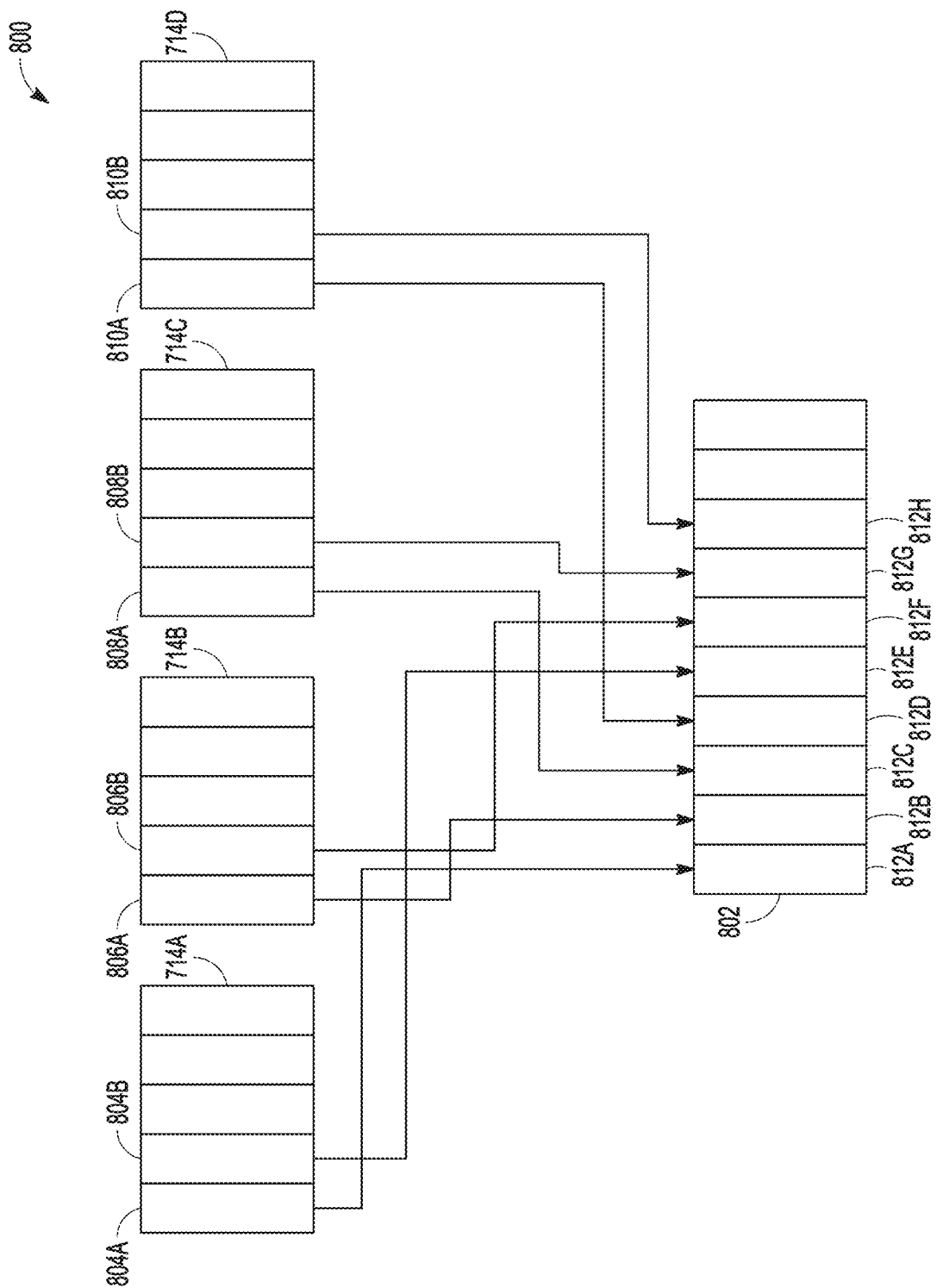
FIG. 8 illustrates one embodiment of a process to combine the disparity sub-maps into a single disparity map.

FIG. 8 illustrates one embodiment of a process 800 to combine the disparity sub-maps 714a-d into a single disparity map 802. The process 800 shown in FIG. 8 interleaves segments from the sub-maps 714a-d into the single disparity map 802. In some aspects, the segments are allocated in a round-robin fashion from the disparity sub-maps to the disparity map 802.

FIG. 8 shows segments in each of the disparity sub-maps 714a-d. A portion of the segments are identified as segments 804a-b in sub-map 714a, 806a-b in sub-map 714b, 808a-b in sub-map 714c, and segments 810a-b in sub-map 714d.

FIG. 8 shows that segment 804a of disparity sub-map 714a is allocated to a first segment 812a of the disparity map 802. Note that the segment 804a of disparity sub-map 714a was derived from first segments 709a and 711a of sub-images 708a and 710a. Note further that the segments 709a and 711a were each derived from a first segment 704a and 706a of their respective input images 702a-b. Thus, each of the segments 704a, 709a, 804a, and 812a may be considered corresponding segments because they occupy an equivalent relative position within their respective structures (images/disparity maps). Similarly, segments 704b, 713a, 806a, and 812b may also be considered corresponding segments for similar reasons. Since each segment in a disparity sub-map and the disparity map 802 result from input from two separate sub-images, each disparity segment has at least two corresponding sub-image (and thus input image) segments.

A segment 812b adjacent to the segment 812a is derived from a different disparity sub-map 714b than the segment 806a (which was derived from the sub-map 714a). A next adjacent segment 806c is derived from another different disparity sub-map 714c. A next adjacent segment 806d is derived from a different disparity sub-map 714d. Thus, adjacent segments in the disparity map 802 are allocated from different disparity sub-maps.

Logically, after sequential segments of the disparity map 802 has been derived from each of the disparity sub-maps 714a-d, the process repeats, and a next adjacent segment, labeled as 812e, is derived from a second segment 804b of the disparity sub-map 714a. A next adjacent segment, labeled as 812f, is derived. from the sub-map 714b, labeled as 806b. A next adjacent segment, labeled as 812g, is derived from the sub-map 714c, the segment labeled as 808b. A further adjacent segment, labeled as 812h is derived from the sub-map 714d, the segment labeled as 810b. Note that while the description of the disparity map 802 is described above as a sequential process, this sequential description is provided merely to illustrate the round robin nature of allocation of segments from sub-images to sequential segments in the disparity map 802. In various aspects, segments may be written to the disparity map in any time-based order. For example, the disparity map 802 may not be written to sequentially. Instead, segments may be written to the disparity map 802 after their respective disparity sub-map creation is completed. In this case, a time-based order of segment allocation to the disparity map 802 may be determined based on which disparity sub-map computations complete first, which could, in some aspects, be a result of thread execution timing, dispatching algorithms, and other aspects not directly related to the operation of the disclosed. embodiments.

Each of the segments 804a, 806a, 808a, and 810a of the disparity sub-maps 714a-d respectively are derived from pairs of corresponding segments, one segment in the pair derived from one of the sub-images 708a-d and one segment in the pair derived from one of the sub-images 710a-d.

Further, as discussed above with respect to FIG. 7, each segment in a sub-image (e.g. sub-images 708a-d and 710a-d) is derived from a corresponding segment in one of the input images 702a and 702b.

Thus, FIG. 8 illustrates that in at least one embodiment, the disparity map 802 is generated from the disparity sub-maps 714a-d by interleaving segments of the disparity sub-maps 714a-d in the disparity map 802 in an inverse order from which corresponding segments of the input images 702a-b were interleaved into sub-images 708a-d and 710a-d. A functional representation of data allocation in the embodiments of FIG. 7 and FIG. 8 may include:

$$si = f_{si}(x,y), \quad \text{(Eq. 2)}$$

where:
$f_{si}(\ )$ is a function that maps pixel coordinates of an input image (e.g. x,y) to a sub-image,
si is a sub-image identifier $$x_2 = f_x(x,y) \quad \text{(Eq. 3)}$$

where:
$f_x(\ )$ is a function that maps pixel coordinates of an input image (e.g. x,y) to an x coordinate $(x_2)$ in a sub-image or a disparity sub-map $$y_2 = f_y(x,y) \quad \text{(Eq. 4)}$$

where:
$f_y(\ )$ is a function that maps pixel coordinates of an input image (e.g. x,y) to a y coordinate $(y_2)$ in a sub-image or disparity sub-map $$dsm = f_{dsm}(si, x, y) \quad \text{(Eq. 5)}$$

where:
$f_{dsm}(\ )$ is a function that maps coordinates (x,y) of a sub-image (si) to a particular disparity sub-map (dsm)

$$x_{dm} = f_{dx}(dsm, x, y) \quad \text{(Eq. 6)}$$

where:
$f_{dx}(\ )$ is a function that maps coordinates (x,y) in a disparity sub map (dsm) to an x coordinate in a disparity map $(x_{dm})$ $$y_{dm} = f_{dy}(dsm, x, y) \quad \text{(Eq. 6)}$$

where:
$f_{dy}(\ )$ is a function that maps coordinates (x,y) in a disparity sub map (dsm) to a y coordinate $(y_{dm})$ in a disparity map.

Note that in the above functional representation, coordinates of a pixel value in a first sub-image of a sub-image pair are equivalent to coordinates of a corresponding disparity value for the pixel value in a disparity sub-map. Thus, fx( ) and $f_y(\ )$ may be used to identify both first sub-image coordinates and disparity sub-map coordinates.

Furthermore, given the above functional representation, embodiments allocating segments of disparity sub-maps to the disparity map in a manner inverse to allocation of segments of input images to sub-images, the following equations hold:

$$x = f_{dx}(f_{dsm}(f_{si}(x,y), f_x(x,y), f_y(x,y)), f_x(x,y), f_x(x,y))) \quad \text{(Eq. 7)}$$

$$y = f_{dy}(f_{dsm}(f_{si}(x,y), f_x(x,y), f_y(x,y)), f_x(x,y), f_x(x,y))) \quad \text{(Eq. 8)}$$

An additional formulaic method for describing allocation of segments in sub-images, disparity sub-maps, and a final disparity map, is as below:

Define:
SegNum—a sequential identification of a segment in an input image (from 0 to n),
NumSub—a number of sub-images;
SubImageNum—a sequential identification of a sub-image (from 0 to NumSub-1),
SubImageSegNum is a sequential identification of a segment in a single sub-image (from zero to x),
DispSubMapNum is a sequential identification of a disparity sub-map (from zero to NumSub-1),
DispSubMapSegNum is a sequential identification of a segment in a disparity sub-map, and
DispMapSegNum is a sequential identification of a segment in a disparity map Then:

SubImageNum=SegNum % NumSub

SubImageSegNum=SegNum/NumSub

DispSubMapNum=SubImageNum

DispSubMapSegNum=SubImagSegNum

DispMapSegNum=SegNum

DispMapSegNum=(NumSub*(DispSubMapSegNum−1)+DispSubMapNum

Figure 9:
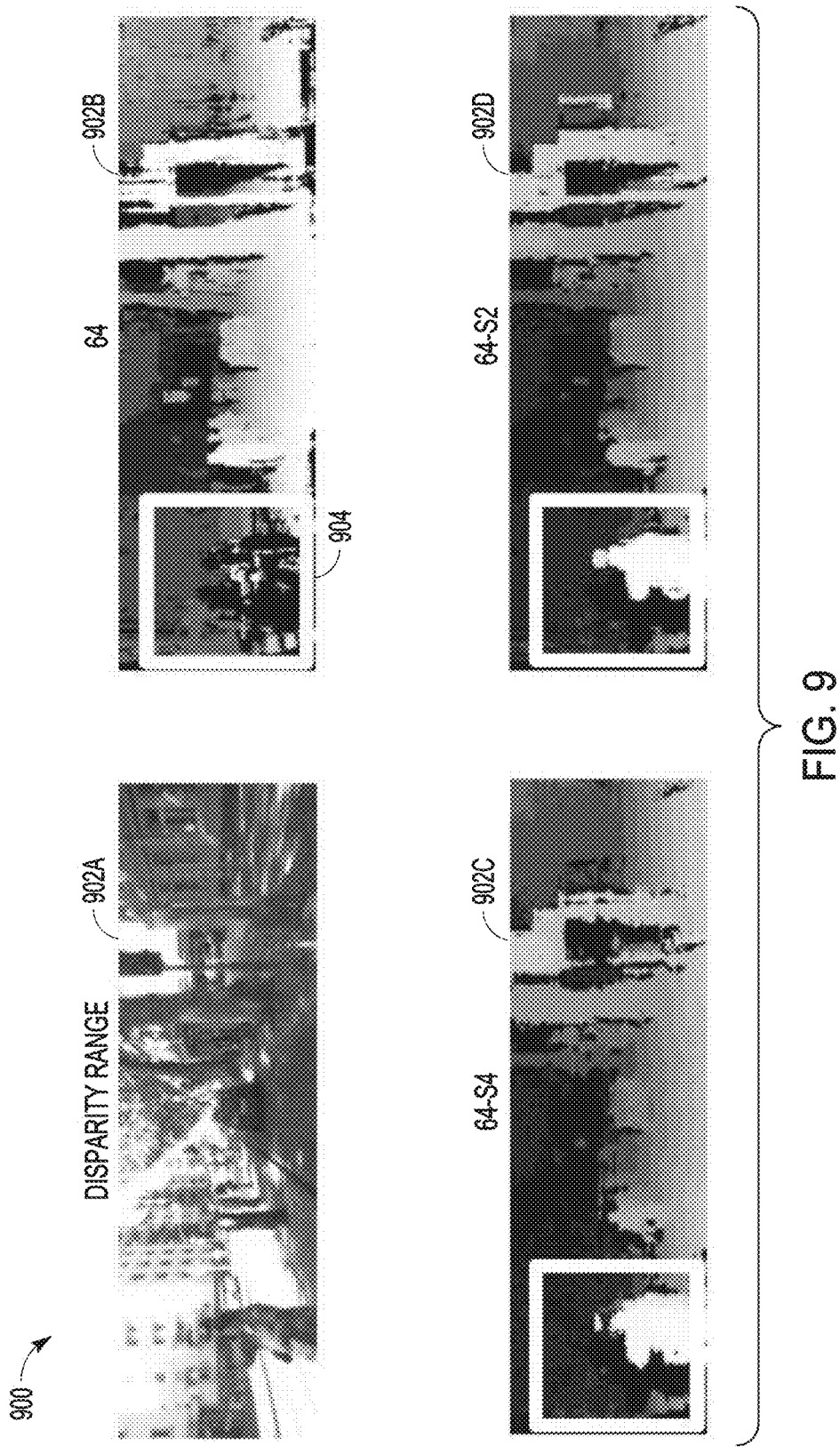
FIG. 9 shows comparisons of object recognition performance when using different sparse sampling techniques.

FIG. 9 shows comparisons of object recognition performance 900 when using different sparse sampling parameters. Four images 902a-d are shown. Image 902a shows an original image as captured in the visual spectrum. Image 902b shows a disparity map using a disparity range of 64. Image 902c shows a disparity map with a disparity range of 64 and a sparse sampling parameter s4. Image 902c uses four sub-images per input image. Thus, the input image is divided into four sub-parts that may each be processed independently by a different processing thread (e.g. separate operating system process, separate thread within a single operating system process). Each of the different processing threads may execute on a different CPU core in at least some embodiments. In some other embodiments, a number of different CPU cores executing the different processing threads is at least more than one.

Image 902d shows a disparity map with a disparity range of 64 with an sparse sampling parameter of s2. Thus, each input image 902d is divided into at least two sub-images. FIG. 9 shows that use of a disparity range of 64 with no sparse sampling results in a failure to detect near objects (shown by box 904 in image 902b). In contrast, use of sparse sampling parameters s2 and s4 provides for recognition of the same object. Moreover, the use of sub-images as proposed with the 64-s2 and 64-s4 provides for improved parallelization on a multi-core CPU and therefore improved performance relative to the technique used with image 902b.

Figure 10:
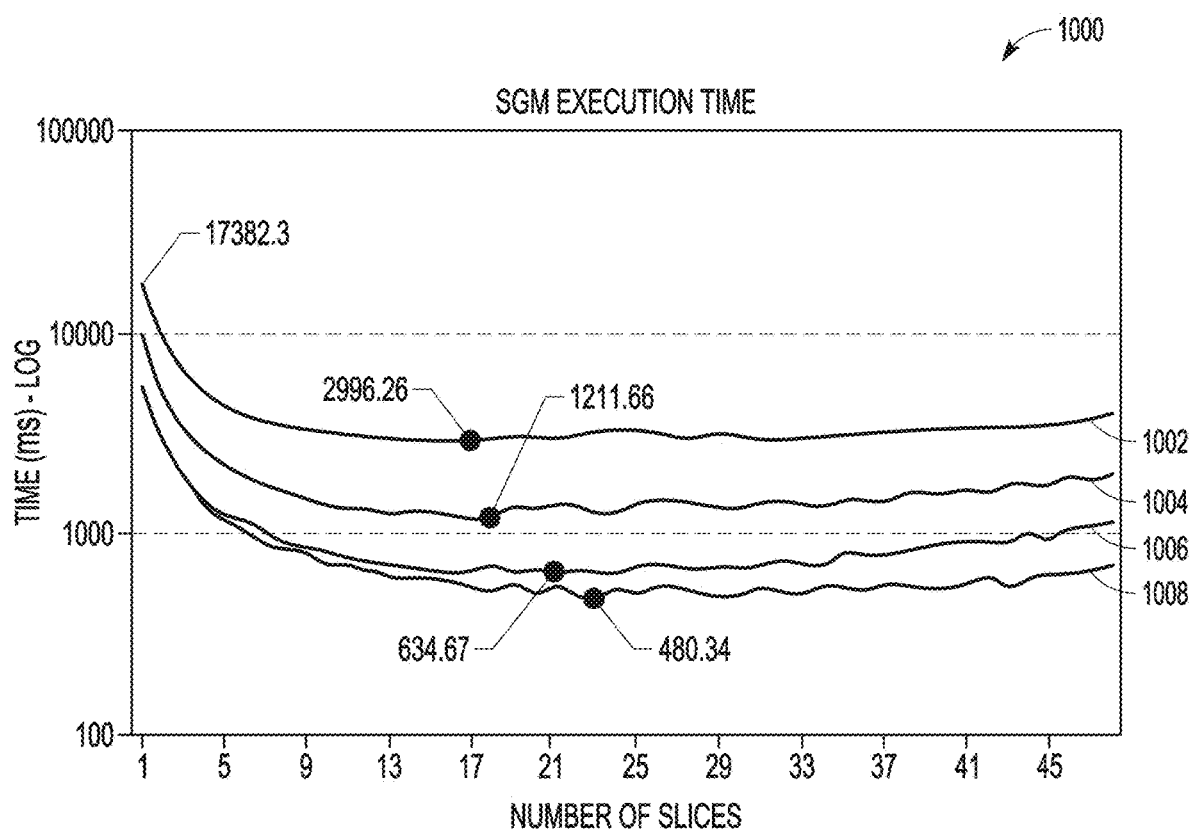
FIG. 10 is a graph that shows a comparison of SGM execution time performance.

FIG. 10 is a graph 1000 that shows a comparison of SGM execution time performance. The graph shows results for four approaches. A first approach, labeled 1002, utilizes a disparity range of 256 with no sub-images. A second approach, labeled 1004, utilizes a disparity range of 128 and two sub-images. A third approach, labeled as 1006, uses a disparity range of 64 and four sub-images. A fourth approach, labeled as 1008, uses a disparity range of 64 and two sub-images.

Each approach was tested using a varying number of horizontal slices, with these results shown along the x axis. The graph 1000 shows that the configuration shown by approach 1006 offers the best performance when applied with 24 horizontal slices.

Figure 11:
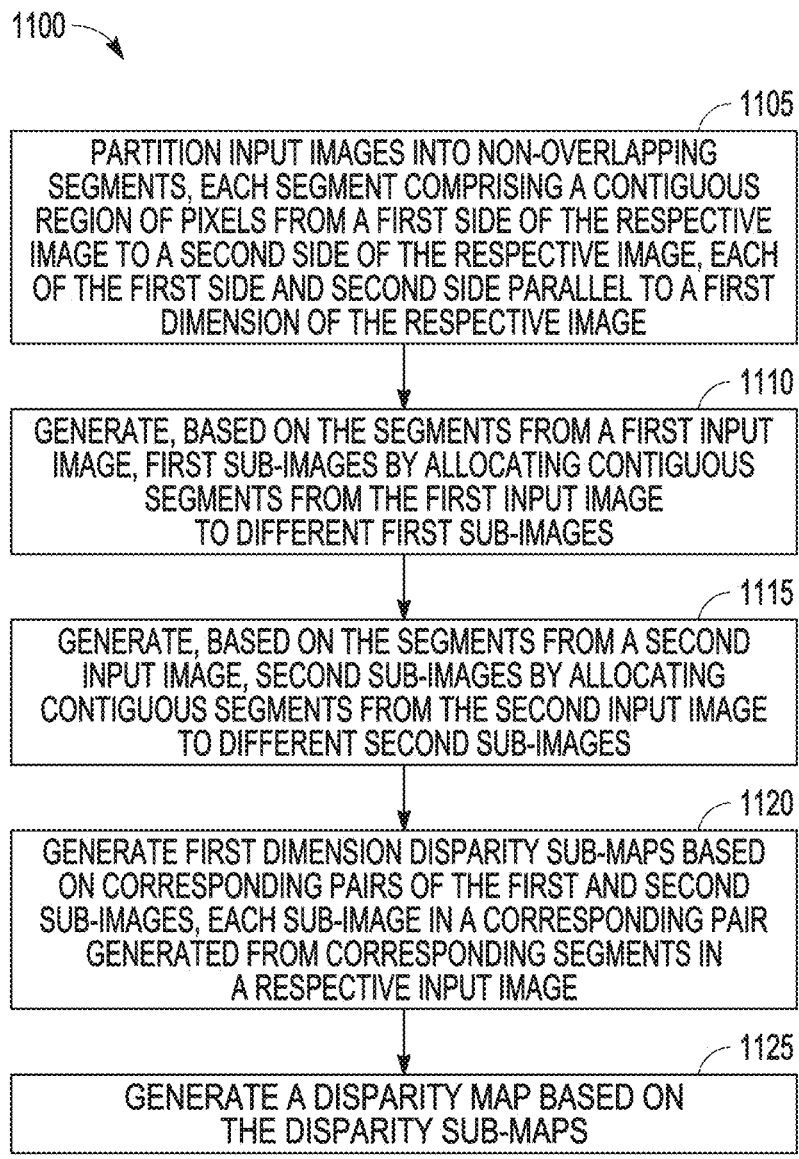
FIG. 11. is a flowchart of a process for determining a disparity map.

FIG. 11 is a flowchart of a process 1100 that determines a disparity map. In some aspects, one or more of the functions discussed below with respect to FIG. 11 and process 1100 may be performed by hardware processing circuitry. For example, in some aspects, instructions (e.g. 1224 discussed below) stored in a memory (e.g. 1204 and/or 1206 discussed below) may configure hardware processing circuitry (e.g. 1202 discussed below) to perform one or more of the functions discussed with respect to FIG. 11 and process 1100.

In operation 1105, input images are partitioned into non-overlapping segments, each segment comprising a contiguous region of pixels extending from a first edge of the respective image to a second edge of the respective image, each of the first edge and second edge parallel to a first dimension of the respective image.

Each of the segments may be rectangular, and in some aspects, may be of equivalent dimensions in both width and length (a first dimension and second dimension). In some aspects operation 1105 includes receiving the input images. The input images may be received, either directly or indirectly, from pairs of imaging sensors. In some aspects, the input images are read from a stable storage device.

As discussed above with respect to FIG. 7, each of the input images 702a and 702b are partitioned into segments. Image 702a is partitioned into at least segments 704a-f. image 702b is partitioned into at least segments 706a-f. The segments of each of the input images are of equivalent size, and dimensions. Corresponding segments (segments occupying equivalent positions within their respective images) of each of the input images include an equivalent number of pixel values. Further, as discussed with respect to FIG. 7, the segments 704a-f of input image 702a extend from a first edge of the image 702a (shown as edge 703a) to a second edge of the image 702a (shown as edge 703b). Similarly, the segments 706a-f of image 702b extend from a first edge 707a of the input image 702b to a second edge 707b of the input image 702b. The example of FIG. 7 describes determination of horizontal disparity, or disparity along the axis 701a, which is parallel or consistent with the edges 703a-b and 707-b. Note that the partitioning described with respect to operation 1105 may not be a physical partitioning but may instead be a logical partitioning of the input images. For example, operation 1105 may include determining boundaries for the segments of each of the input images. The partitioning may not include any physical dividing of data between the segments.

In operation 1110, first sub-images are generated on a first input image (of the input images of operation 1105). To generate the first sub-images, contiguous segments defined in operation 1105 are allocated to different sub-images of the first sub-images. For example, sub-images 708a-d are generated from input image 702a. As discussed above, contiguous segments from the first input image may be allocated in a round-robin manner to the first sub-images. Thus, as discussed above, if sequential segments of an input image are identified via a numerical identifier (e.g. SegNum=0 . . . number of segments−1), and there are N sub-images, a segment may be assigned to a sub-image (identified as 0 . . . N−1) according to SegNum % N (where % is a C-language remainder operator). A segment within the identified sub-image may be identified as SubImageSegNum=SegNum/N.

Note that it some aspects, the generation of the sub-images may not be a physical generation, for example, including copying of pixel values from the input image to a separate memory space defining a sub-image. Instead, some aspects may define sub-images logically, but defining portions of the input image that are included in the sub-image. For example, a mapping data structure may be maintained that describes which segments of an input image are allocated to which sub-images, without physically copying any portions of pixel values of the input image.

Operation 1115 generates based on segments from a second input image (of the input images of operation 1105) second sub-images. For example, sub-images 710a-d are generated from input image 702b. Operation 1115 may operate in a manner consistent with that described above with respect to operation 1110 for the first sub-images, but relies on a different input image than operation 1110 to generate the second sub-images.

In operation 1120, disparity maps are generated from corresponding pairs of first and second sub-images. For example, as discussed above with respect to FIG. 7, disparity sub-maps 714a-d are generated based on pairs of sub-images (708a, 710a) (708b, 710b), (708c, 710c), and (708d, 710d) respectively. Thus, sub-images (708a, 710a) (708b, 710b), (708c, 710c), and (708d, 710d) are corresponding sub-images because sub-images in a pair are derived from segments of their respective input image that have equivalent relative positions within the respective input image. The disparity sub-maps are generated with respect to the first dimension, which, as discussed above, is a dimension that is parallel with the first and second edges (e.g. 703a-b and 707a-b) from which all the segments extend in a particular input image. Each of the disparity sub-maps may be generated according to a semi-global matching method in some aspects. Note that the semi-global matching method may include a search space when identifying a corresponding pixel value between two sub-images. The search space may include pixel values from at least two different segments used to form or generate a particular sub-image. Thus, the search space may encompass two segments that are contiguous in a sub-image but were not contiguous in an original input image. However, there is no overlap between the segments in the sub-image relative to the segments of the original input-image.

In some aspects, the generation of the disparity sub-maps in operation 1120 may be performed by multiple distinct hardware circuitry or multiple processing cores. As discussed above, in some aspects, a number of sub-images generated per input image by process 1100 may be set such that each disparity sub-map may be generated in parallel. Alternatively, fewer disparity sub-maps may be generated than processing cores available. However, generating any more than one disparity sub-map presents opportunities for parallelizing the generation of the multiple sub-maps. For example, in some aspects, a first portion of the disparity sub-maps may be assigned for generation by a first processing core, and a second portion of the disparity sub-maps may be assigned for generation by a second processing core.

In operation 1125, a disparity map is generated based on the disparity sub-maps. In some aspects, operation 1125 operates in a manner consistent with the description of FIG. 8 above. For example, contiguous segments of the disparity map may be derived from segments of different disparity sub-maps. The disparity map may be generated such that disparity values in a particular relative position of the disparity map, are derived from pixel values of an input image having an equivalent relative position within the input image. The coordinates of the disparity value in the disparity map may be equivalent to coordinates of a pixel value within at least one input image, with the disparity value being based on the pixel value.

In some aspects, process 1100 may include detecting one or more objects in the input images. A distance from imaging sensors capturing the images to the detected objects may be determined by the disparity map. For example, objects with greater disparity between the two images (disparity greater than a threshold) may be within a first distance of the imaging sensors, while objects with less disparity (less than a second threshold) are further from the two imaging sensors.

In some aspects, an autonomous vehicle may be controlled based on the identified distances of the one or more objects. For example, objects detected to be within a particular distance threshold may require control inputs to the autonomous vehicle that cause the vehicle to avoid the objects. Objects at greater distances may not require the same control inputs. By parallelizing computation of the multiple disparity sub-maps as described above, generation of the disparity map may be fast enough to fit within real time object recognition and control input timing constraints to operate an autonomous vehicle at speeds above a threshold speed.

Figure 12:
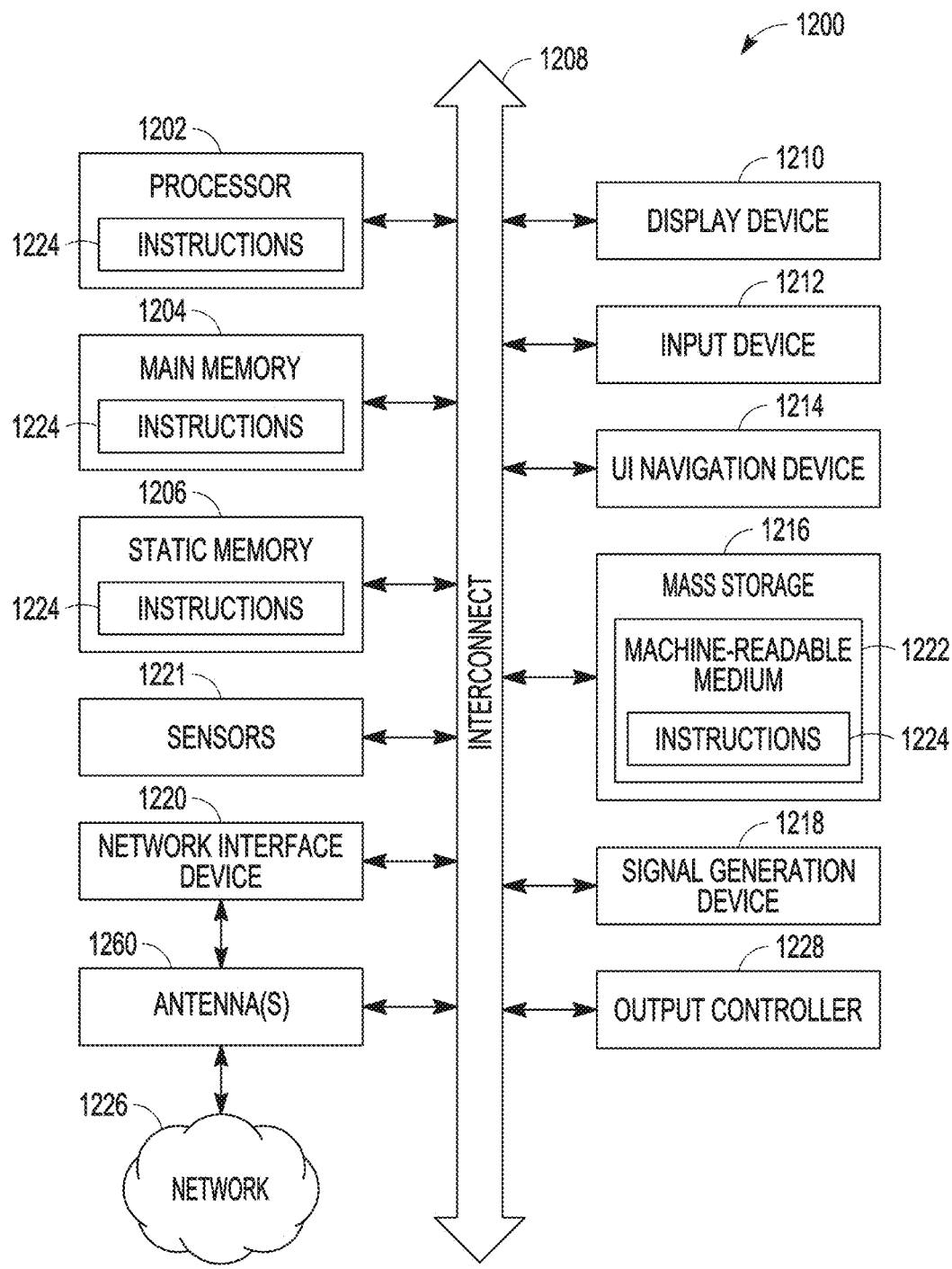
FIG. 12 illustrates a block diagram of an example machine upon which any one or more of the techniques (e.g., methodologies) discussed herein may perform.

FIG. 12 illustrates a block diagram of an example machine 1200 upon which any one or more of the techniques (e.g., methodologies) discussed herein may perform. Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208.

Specific examples of main memory 1204 include Random Access Memory (RAM), and semiconductor memory devices, which may include, in some embodiments, storage locations in semiconductors such as registers. Specific examples of static memory 1206 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1200 may further include a display device 1210, an input device 1212 (e.g., a keyboard), and a user interface (UI) navigation device 1214 (e.g., a mouse). In an example, the display device 1210, input device 1212 and UI navigation device 1214 may be a touch screen display. The machine 1200 may additionally include a mass storage (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1202 and/or instructions 1224 may comprise processing circuitry and/or transceiver circuitry.

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1222 is illustrated as a single medium, the term "machine readable medium" may include a single medium or multiple media (e.g., a centralized or distributed database, and/or associated caches and servers) configured to store the one or more instructions 1224.

An apparatus of the machine 1200 may be one or more of a hardware processor 1202 (e.g., a central processing unit (CPU), a graphics processing unit (GPU), a hardware processor core, or any combination thereof), a main memory 1204 and a static memory 1206, sensors 1221, network interface device 1220, antennas 1260, a display device 1210, an input device 1212, a UI navigation device 1214, a mass storage 1216, instructions 1224, a signal generation device 1218, and an output controller 1228. The apparatus may be configured to perform one or more of the methods and/or operations disclosed herein. The apparatus may be intended as a component of the machine 1200 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1224 may further be transmitted or received over a. communications network 1226 using a transmission medium via the network interface device 1220 utilizing any one of a number of transfer protocols (e.g., frame relay, interact protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1220 may include one or more physical jacks (e.g., Ethernet, coaxial, or phone jacks) or one or more antennas to connect to the communications network 1226. In an example, the network interface device 1220 may include one or more antennas 1260 to wirelessly communicate using at least one of single-input multiple-output (SIMO), multiple-input multiple-output (MIMO), or multiple-input single-output (MISO) techniques. In some examples, the network interface device 1220 may wirelessly communicate using Multiple User MIMO techniques. The term "transmission medium" shall be taken to include any intangible medium that is capable of storing, encoding or carrying instructions for execution by the machine 1200, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Example 1 is a computer readable storage medium comprising instructions that when executed configure hardware processing circuitry to perform operations to generate a disparity map, the operations comprising: partitioning each of a first input image and a second input image into non-overlapping segments, each segment comprising a contiguous region of pixels from a first edge of the respective image to a second edge of the respective image, each of the first edge and second edge of the respective image parallel to a first dimension of the respective image; generating, based on the segments from the first input image, first sub-images by allocating contiguous segments from the first input image to different first sub-images; generating based on segments from the second input image, second sub-images by allocating contiguous segments from the second input image to different second sub-images; generating first dimension disparity sub-maps based on corresponding pairs of the first and second sub-images, each sub-image in a corresponding pair generated from corresponding segments in a respective input image; and generating a disparity map based on the disparity sub-maps.

In Example 2, the subject matter of Example 1 includes, assigning generation of a first portion of the first-dimension disparity sub-maps to a first processing thread and assigning generation of a second portion of the first-dimension disparity sub-maps to a second processing thread.

In Example 3, the subject matter of Example 2 includes, wherein generating the first-dimension disparity sub-maps comprises executing a semi-global matching method.

in Example 4, the subject matter of Examples 1-3 includes, wherein generating the first-dimension disparity sub-maps comprises searching a region of a first sub-image of the first sub-images for a first pixel matching a second pixel in a second sub-image of the second sub-images, the region spanning two first segments from the first input image.

in Example 5, the subject matter of Examples 1-4 includes, wherein the input images are captured by respective imaging sensors, the operations comprising determining a distance of an object represented by the input images from the imaging sensors based on the disparity map.

In Example 6, the subject matter of Example 5 includes, controlling a vehicle based on the distance.

In Example 7, the subject matter of Examples 1-6 includes, the operations further comprising segmenting the input images such that each segment is of constant size in the first dimension.

In Example 8, the subject matter of Examples 1-7 includes, wherein the first sub-images are generated by round robin allocating contiguous segments from the first input image to different sub-images of the first sub-images.

In Example 9, the subject matter of Examples 1-8 includes, wherein generating the disparity map comprising generating contiguous segments of the disparity map from different disparity sub-maps.

in Example 10, the subject matter of Examples 1-9 includes, wherein the disparity map is generated such that disparity values in the disparity map are based on pixel values in an input image having equivalent coordinates.

Example 11 is a method of generating a disparity map with hardware processing circuitry, comprising: partitioning each of a first input image and a second input image into non-overlapping segments, each segment comprising a contiguous region of pixels from a first edge of the respective image to a second edge of the respective image, each of the first edge and second edge of the respective image parallel to a first dimension of the respective image; generating, based on the segments from the first input image, first sub-images by allocating contiguous segments from the first input image to different first sub-images; generating based on segments from the second input image, second sub-images by allocating contiguous segments from the second input image to different second sub-images; generating first dimension disparity sub-maps based on corresponding pairs of the first and second sub-images, each sub-image in a corresponding pair generated from corresponding segments in a respective input image; and generating a disparity map based on the disparity sub-maps.

In Example 12, the subject matter of Example 11 includes, assigning generation of a first portion of the first-dimension disparity sub-maps to a first processing thread and assigning generation of a second portion of the first-dimension disparity sub-maps to a second processing thread.

in Example 13, the subject matter of Example 12 includes, wherein generating the first-dimension disparity sub-maps comprises executing a semi-global matching method.

In Example 14, the subject matter of Examples 11-13 includes, wherein generating the first-dimension disparity sub-maps comprises searching a region of a first sub-image of the first sub-images for a first pixel matching a second pixel in a second sub-image of the second sub-images, the region spanning two first segments from the first input image.

In Example 15, the subject matter of Examples 11-14 includes, wherein the input images are captured by respective imaging sensors, the method further comprising determining a distance of an object represented by the input images from the imaging sensors based on the disparity map.

In Example 16, the subject matter of Example 15 includes, controlling a vehicle based on the distance.

in Example 17, the subject matter of Examples 11-16 includes, segmenting the input images such that each segment is of constant size in the first dimension.

In Example 18, the subject matter of Examples 11-17 includes, wherein the first sub-images are generated by round robin allocating contiguous segments from the first input image to different sub-images of the first sub-images.

In Example 19, the subject matter of Examples 11-18 includes, wherein generating the disparity map comprising generating contiguous segments of the disparity map from different disparity sub-maps.

in Example 20, the subject matter of Examples 11-19 includes, wherein the disparity map is generated such that disparity values in the disparity map are based on pixel values in an input image having equivalent coordinates.

Example 21 is a system to generate a disparity map, comprising: hardware processing circuitry; one or more hardware memories storing instructions that when executed, configure the hardware processing circuitry to perform operations comprising: partitioning each of a first input image and a second input image into non-overlapping segments, each segment comprising a contiguous region of pixels from a first edge of the respective image to a second edge of the respective image, each of the first edge and second edge of the respective image parallel to a first dimension of the respective image; generating, based on the segments from the first input image, first sub-images by allocating contiguous segments from the first input image to different first sub-images; generating based on segments from the second input image, second sub-images by allocating contiguous segments from the second input image to different second sub-images; generating first dimension disparity sub-maps based on corresponding pairs of the first and second sub-images, each sub-image in a corresponding pair generated from corresponding segments in a respective input image; and generating a disparity map based on the disparity sub-maps.

In Example 22, the subject matter of Example 21 includes, the operations further comprising assigning generation of a first portion of the first-dimension disparity sub-maps to a first processing thread and assigning generation of a second portion of the first-dimension disparity sub-maps to a second processing thread.

In Example 23, the subject matter of Example 22 includes, wherein generating the first-dimension disparity sub-maps comprises executing a semi-global matching method.

In Example 24, the subject matter of Examples 21-23 includes, wherein generating the first-dimension disparity sub-maps comprises searching a region of a first sub-image of the first sub-images for a first pixel matching a second. pixel in a second sub-image of the second sub-images, the region spanning two first segments from the first input image.

In Example 25, the subject matter of Examples 21-24 includes, wherein the input images are captured by respective imaging sensors, the method further comprising determining a distance of an object represented by the input images from the imaging sensors based on the disparity map.

in Example 26, the subject matter of Example 25 includes, the operations further comprising controlling a vehicle based on the distance.

in Example 27, the subject matter of Examples 21-26 includes, the operations further comprising segmenting the input images such that each segment is of constant size in the first dimension.

in Example 28, the subject matter of Examples 21-27 includes, wherein each sub-image in the first sub-images is generated by round robin allocating contiguous segments from the first input image to different sub-images of the first sub-images.

in Example 29, the subject matter of Examples 21-28 includes, wherein generating the disparity map comprising generating contiguous segments of the disparity map from different disparity sub-maps.

In Example 30, the subject matter of Examples 21-29 includes, wherein the disparity map is generated such that disparity values in the disparity map are based on pixel values in an input image having equivalent coordinates.

Example 31 is an apparatus of generating a disparity map with hardware processing circuitry, comprising: means for partitioning each of a first input image and a second input image into non-overlapping segments, each segment comprising a contiguous region of pixels from a first edge of the respective image to a second edge of the respective image, each of the first edge and second edge of the respective image parallel to a first dimension of the respective image; means for generating, based on the segments from the first input image, first sub-images by allocating contiguous segments from the first input image to different first sub-images; means for generating based on segments from the second input image, second sub-images by allocating contiguous segments from the second input image to different second sub-images; means for generating first dimension disparity sub-maps based on corresponding pairs of the first and second sub-images, each sub-image in a corresponding pair generated from corresponding segments in a respective input image; and means for generating a disparity map based on the disparity sub-maps.

in Example 32, the subject matter of Example 31 includes, means for assigning generation of a first portion of the first-dimension disparity sub-maps to a first processing thread and means for assigning generation of a second portion of the first-dimension disparity sub-maps to a second processing thread.

In Example 33, the subject matter of Example 32 includes, wherein the means for generating the first-dimension disparity sub-maps is configured to execute a semi-global matching method to generate the first-dimension disparity sub-maps.

In Example 34, the subject matter of Examples 31-33 includes, wherein the means for generating the first-dimension disparity sub-maps is configured to search a region of a first sub-image of the first sub-images for a first pixel matching a second pixel in a second sub-image of the second sub-images, the region spanning two first segments from the first input image.

In Example 35, the subject matter of Examples 31-34 includes, wherein the input images are captured by respective imaging sensors, the apparatus further comprising means for determining a distance of an object represented by the input images from the imaging sensors based on the disparity map.

In Example 36, the subject matter of Example 35 includes, means for controlling a vehicle based on the distance.

In Example 37, the subject matter of Examples 31-36 includes, means for segmenting the input images such that each segment is of constant size in the first dimension.

In Example 38, the subject matter of Examples 31-37 includes, wherein the means for generating each of the first and second sub-images are both configured to generate the respective sub-images by round robin allocating contiguous segments from an input image to different sub-images.

In Example 39, the subject matter of Examples 31-38 includes, wherein the means for generating the disparity map is configured to generate contiguous segments of the disparity map from different disparity sub-maps.

In Example 40, the subject matter of Examples 31-39 includes, wherein the means for generating the disparity map is configured to generate the disparity map such that disparity values in the disparity map are based on pixel values in an input image having equivalent coordinates.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

What is claimed is:

1. A system to generate a disparity map, comprising:
hardware processing circuitry;
one or more hardware memories storing instructions that when executed, configure the hardware processing circuitry to perform operations comprising:
partitioning each of a first input image and a second input image into non-overlapping segments, each segment comprising a contiguous region of pixels from a first edge of the respective image to a second edge of the respective image, each of the first edge and second edge of the respective image parallel to a first dimension of the respective image, wherein the input images are captured by respective imaging sensors;
generating, based on the segments from the first input image, first sub-images by allocating contiguous segments from the first input image to different first sub-images;
generating, based on segments from the second input image, second sub-images by allocating contiguous segments from the second input image to different second sub-images;
generating first-dimension disparity sub-maps based on corresponding pairs of the first and second sub-images, each sub-image in a corresponding pair generated from corresponding segments in a respective input image, wherein generating the first-dimension disparity sub-maps comprises searching a region of a first sub-image of the first sub-images for a first pixel matching a second pixel in a second sub-image of the second sub-images, the region spanning at least two first segments from the first input image;
generating the disparity map based on the first-dimension disparity sub-maps; and
determining a distance of an object represented by the input images from the imaging sensors based on the disparity map.

2. The system of claim 1, the operations further comprising assigning generation of a first portion of the first-dimension disparity sub-maps to a first processing thread and assigning generation of a second portion of the first-dimension disparity sub-maps to a second processing thread.

3. The system of claim 2, wherein generating the first-dimension disparity sub-maps comprises executing a semi-global matching method.

4. The system of claim 1, the operations further comprising controlling a vehicle based on the distance.

5. The system of claim 1, the operations further comprising segmenting the input images such that each segment is of constant size in the first dimension.

6. The system of claim 1, wherein each sub-image in the first sub-images is generated by round robin allocating contiguous segments from the first input image to different sub-images of the first sub-images.

7. The system of claim 1, wherein generating the disparity map comprising generating contiguous segments of the disparity map from different disparity sub-maps.

8. The system of claim 1, wherein the disparity map is generated such that disparity values in the disparity map are based on pixel values in an input image having equivalent coordinates.

9. The system of claim 1, wherein determining the distance of an object represented by the input images from the imaging sensors based on the disparity map comprises:
determining an amount of disparity between a portion of the object in the first input image and the portion of the object in the second input image; and
determining the distance to be within a threshold distance from the imaging sensors when the amount of disparity is greater than a disparity threshold, or determining the distance to be farther than the threshold distance from the imaging sensors when the amount of disparity is less than the disparity threshold.

10. A method of generating a disparity map with hardware processing circuitry, comprising:
partitioning each of a first input image and a second input image into non-overlapping segments, each segment comprising a contiguous region of pixels from a first edge of the respective image to a second edge of the respective image, each of the first edge and second edge of the respective image parallel to a first dimension of the respective image, wherein the input images are captured by respective imaging sensors;
generating, based on the segments from the first input image, first sub-images by allocating contiguous segments from the first input image to different first sub-images;
generating, based on segments from the second input image, second sub-images by allocating contiguous segments from the second input image to different second sub-images;
generating first-dimension disparity sub-maps based on corresponding pairs of the first and second sub-images, each sub-image in a corresponding pair generated from corresponding segments in a respective input image, wherein generating the first-dimension disparity sub-maps comprises searching a region of a first sub-image of the first sub-images for a first pixel matching a second pixel in a second sub-image of the second sub-images, the region spanning at least two first segments from the first input image;
generating the disparity map based on the first-dimension disparity sub-maps; and
determining a distance of an object represented by the input images from the imaging sensors based on the disparity map.

11. The method of claim 10, further comprising assigning generation of a first portion of the first-dimension disparity sub-maps to a first processing thread and assigning generation of a second portion of the first-dimension disparity sub-maps to a second processing thread.

12. The method of claim 11, wherein generating the first-dimension disparity sub- maps comprises executing a semi-global matching method.

13. The method of claim 10, further comprising segmenting the input images such that each segment is of constant size in the first dimension.

14. The method of claim 10, wherein the first sub-images are generated by round robin allocating contiguous segments from the first input image to different sub-images of the first sub-images.

15. The method of claim 10, wherein generating the disparity map comprising generating contiguous segments of the disparity map from different disparity sub-maps.

16. The method of claim 10, wherein the disparity map is generated such that disparity values in the disparity map are based on pixel values in an input image having equivalent coordinates.

17. The method of claim 10, wherein determining the distance of an object represented by the input images from the imaging sensors based on the disparity map comprises:
   determining an amount of disparity between a portion of the object in the first input image and the portion of the object in the second input image; and
   determining the distance to be within a threshold distance from the imaging sensors when the amount of disparity is greater than a disparity threshold, or determining the distance to be farther than the threshold distance from the imaging sensors when the amount of disparity is less than the disparity threshold.

18. A non-transitory computer readable storage medium comprising instructions that when executed configure hardware processing circuitry to perform operations to generate a disparity map, the operations comprising:
   partitioning each of a first input image and a second input image into non-overlapping segments, each segment comprising a contiguous region of pixels from a first edge of the respective image to a second edge of the respective image, each of the first edge and second edge of the respective image parallel to a first dimension of the respective image, wherein the input images are captured by respective imaging sensors;
   generating, based on the segments from the first input image, first sub-images by allocating contiguous segments from the first input image to different first sub-images;
   generating, based on segments from the second input image, second sub-images by allocating contiguous segments from the second input image to different second sub-images;
   generating first-dimension disparity sub-maps based on corresponding pairs of the first and second sub-images, each sub-image in a corresponding pair generated from corresponding segments in a respective input image, wherein generating the first-dimension disparity sub-maps comprises searching a region of a first sub-image of the first sub-images for a first pixel matching a second pixel in a second sub-image of the second sub-images, the region spanning at least two first segments from the first input image;
   generating the disparity map based on the first-dimension disparity sub-maps; and
   determining a distance of an object represented by the input images from the imaging sensors based on the disparity map.

19. The non-transitory computer readable storage medium of claim 18, further comprising assigning generation of a first portion of the first-dimension disparity sub-maps to a first processing thread and assigning generation of a second portion of the first-dimension disparity sub-maps to a second processing thread.

20. The non-transitory computer readable storage medium of claim 19, wherein generating the first-dimension disparity sub-maps comprises executing a semi-global matching method.

21. The non-transitory computer readable storage medium of claim 18, wherein the first sub-images are generated by round robin allocating contiguous segments from the first input image to different sub-images of the first sub-images.

22. The non-transitory computer readable storage medium of claim 18, wherein the first and second input images are captured by respective imaging sensors, the operations further comprising determining, based on the disparity map, a distance from the imaging sensors of an object represented by the first and second input images.

23. The non-transitory computer readable storage medium of claim 22, the operations further comprising controlling a vehicle based on the distance.

24. The non-transitory computer readable storage medium of claim 18, wherein determining the distance of an object represented by the input images from the imaging sensors based on the disparity map comprises:
   determining an amount of disparity between a portion of the object in the first input image and the portion of the object in the second input image; and
   determining the distance to be within a threshold distance from the imaging sensors when the amount of disparity is greater than a disparity threshold, or determining the distance to be farther than the threshold distance from the imaging sensors when the amount of disparity is less than the disparity threshold.

* * * * *

UNITED STATES PATENT AND TRADEMARK OFFICE
CERTIFICATE OF CORRECTION

| | | |
|---|---|---|
| PATENT NO. | : 11,508,079 B2 | Page 1 of 1 |
| APPLICATION NO. | : 16/456356 | |
| DATED | : November 22, 2022 | |
| INVENTOR(S) | : Tsai et al. | |

It is certified that error appears in the above-identified patent and that said Letters Patent is hereby corrected as shown below:

In the Claims

In Column 22, Line 59, in Claim 12, delete "sub- maps" and insert --sub-maps-- therefor Signed and Sealed this
Twenty-ninth Day of August, 2023

Katherine Kelly Vidal
*Director of the United States Patent and Trademark Office*